(12) United States Patent
Kawashima

(10) Patent No.: US 7,017,999 B2
(45) Date of Patent: Mar. 28, 2006

(54) WORKPIECE CARRIER

(75) Inventor: Sosuke Kawashima, Kanagawa (JP)

(73) Assignee: NSK Ltd., Tokyo (JP)

( * ) Notice: Subject to any disclaimer, the term of this patent is extended or adjusted under 35 U.S.C. 154(b) by 267 days.

(21) Appl. No.: 10/630,840

(22) Filed: Jul. 31, 2003

(65) Prior Publication Data
US 2004/0099512 A1 May 27, 2004

(30) Foreign Application Priority Data
Jul. 31, 2002 (JP) ............................ P2002-223906

(51) Int. Cl.
*B23Q 1/25* (2006.01)
(52) U.S. Cl. ............................................... 299/71
(58) Field of Classification Search ................ 269/71, 269/43, 289 R, 55, 21
See application file for complete search history.

(56) References Cited

U.S. PATENT DOCUMENTS

| 4,013,280 | A | * | 3/1977 | Chitayat et al. | 269/60 |
| 6,254,076 | B1 | * | 7/2001 | Goldin | 269/285 |
| 6,409,161 | B1 | * | 6/2002 | Wolff et al. | 269/43 |

FOREIGN PATENT DOCUMENTS

| JP | 7-28444 Y2 | 6/1995 |
| JP | 2000-346165 A | 12/2000 |

* cited by examiner

*Primary Examiner*—Lee D. Wilson
(74) *Attorney, Agent, or Firm*—Sughrue Mion, PLLC

(57) ABSTRACT

Separating members are provided at both ends in a moving direction of each of workpiece mounting seats of a carriage. Each of the separating members separates an elastic seal blade, which seals an opening portion formed between a side wall portion of a casing body and a top plate, from an outer surface of a workpiece mounting seat.

14 Claims, 7 Drawing Sheets

WORKPIECE CARRIER

BACKGROUND OF THE INVENTION

1. Field of the Invention

This invention relates to a workpiece carrier for use in clean environment, such as a clean room.

2. Description of the Related Art

Hitherto, an apparatus disclosed in JP-UM-B-7-28444 has been known as a workpiece carrier for use in a clean room. This workpiece carrier comprises an elongated guide rail, a nut block having ball, end caps, a large number of balls, and a support unit. The elongated guide rail has ball rolling grooves. The nut block has ball rolling grooves respectively provided in both outer faces thereof and opposed to the ball rolling grooves of the guide rail. The end caps are respectively fixed to both axial end portions of the nut block and adapted to communicate each of the ball rolling grooves of the nut block with a ball return passage thereby to form a ball circulating passage. The large number of balls are adapted to circulate along the ball circulating passage. The support unit is fixed to the guide rail and adapted to support a feed screw shaft screwed into the nut block in such a way as to be rotatable and as to be unable to axially move. Further, the nut block has overhanging portions provided in such a way as to be close to and cover the top portions of both side walls of the guide rail. The guide rail is constructed so that an upper portion thereof is covered with an upwardly swelling flexible sealing member by causing the nut block to pass on the guide rail, that a magnetic material is used in the sealing member, and that a rubber magnet for sucking the sealing member is provided on the top portion of the guide rail. Thus, the opening portion is prevented as much as possible from being exposed. Consequently, for example, lubricant is prevented from flying from the inside of the apparatus to the outside thereof.

However, there is a fear that when the nut block moves, abrasive powder is generated in such a workpiece carrier by friction between the end cap, which moves together with this nut block, and the sealing member. In the case of requiring an extremely high degree of cleanness, there is room for further improvement. Thus, JP-A-2000-346165 discloses a workpiece carrier, of which the movable body partly projects to the outside through an opening portion formed by an exterior cover and moves along the opening portion, comprises a pair of elastic sealing members, a first magnetic circuit, and a second magnetic circuit. The elastic sealing members have flexibility and are enabled to cover the opening portion. The first magnetic circuit imparts to the sealing member a suction force acting in a direction in which the opening portion is covered. The second magnetic circuit is provided on the movable body for generating a repulsion force between the first and second magnetic circuits.

In the case of such a workpiece carrier, there is no fear that similarly as in the workpiece carrier described in JP-UM-B-7-28444, abrasive powder is generated by the sliding contact between the movable body and the elastic sealing member.

However, the paired sealing members are mutually agnetized in opposite polarities. Thus, the sealing members intimately contacted with each other should be separated from each other by the passing of the movable body. This requires that a large magnetic force is provided at the side of the movable body, and that a smooth change from the intimately contacted state of the sealing members to the separated state thereof is achieved. Control of a balance among the magnetic forces of these elements and body is necessary for fulfillment of such requirements and difficult to achieve. Thus, the cost thereof is high. Moreover, such a workpiece carrier has a problem in that because a total of four elastic sealing members are needed, this causes an increase in the number of components and a rise in the cost thereof.

SUMMARY OF THE INVENTION

The invention is accomplished by focusing on such problems. Accordingly, an object of the invention is to provide a workpiece carrier enabled to surely prevent external leakage of dust and lubricant.

To achieve the foregoing object, according to the invention, there is provided a workpiece carrier (hereunder referred to as a first workpiece carrier of the invention) comprising a feed mechanism, a carriage fed and driven by the feed mechanism, and a casing accommodating at least a part of the feed mechanism and the carriage. In this workpiece carrier, the casing has at least one opening portion which is provided along a direction of feeding performed by the feed mechanism, and an elastic seal blade for sealing the opening portion. Further, the carriage has a block-like workpiece mounting seat, which passes through the opening portion and projects upwardly from the casing, and also has separating members, which are provided at both ends in a moving direction of the workpiece mounting seat, for separating the elastic seal blade from an outer surface of the workpiece mounting seat.

According to an embodiment (hereunder referred to as a second workpiece carrier of the invention) of the first workpiece carrier of the invention, the separating member has a plurality of gas blowoff holes in a part facing the elastic seal blade.

According to another embodiment (hereunder referred to as a third workpiece carrier of the invention) of the first workpiece carrier of the invention, the separating member has a first magnetic force generating surface on a part thereof facing the elastic seal blade. Moreover, the elastic seal blade has a second magnetic force generating surface, which is provided on a part thereof facing the separating member and has the same polarity as that of the first magnetic force generating surface.

According to an embodiment (hereunder referred to as a fourth workpiece carrier of the invention) of one of the first to third workpiece carriers of the invention, the casing has a suction hole for setting an interior portion of the casing under a negative pressure.

According to an embodiment (hereunder referred to as a fifth workpiece carrier of the invention) of one of the first to fourth workpiece carriers of the invention, the elastic seal blade is constructed in such a way as to be easy to expand in a feed direction of the feed mechanism and as to be less easy to expand in a direction perpendicular to the feed direction.

According to an embodiment (hereunder referred to as a sixth workpiece carrier of the invention) of the fifth workpiece carrier of the invention, the elastic seal blade is formed like an elongated rectangle and has a plurality of incision grooves. Moreover, the incision grooves are provided alternately in front and rear surface portions in such a way as to be parallel to one another in a direction perpendicular to a longitudinal direction of the elastic seal blade.

According to an embodiment (hereunder referred to as a seventh workpiece carrier of the invention) of the fifth workpiece carrier of the invention, the elastic seal blade is formed like an elongated rectangle and has a plurality of slits. Moreover, the slits are provided in such a way as to extend in a direction perpendicular to a longitudinal direction of the elastic seal blade and as be parallel to one another.

According to an embodiment (hereunder referred to as an eighth workpiece carrier of the invention) of the fifth workpiece carrier of the invention, the elastic seal blade is formed like an elongated rectangle and has a plurality of folding lines. Moreover, the folding lines are provided in such a way as to extend in a direction perpendicular to a longitudinal direction of the elastic seal blade and as be parallel to one another.

DETAILED DESCRIPTION OF THE INVENTION

Hereinafter, embodiments of the invention are described with reference to the accompanying drawings.

Figure 1:
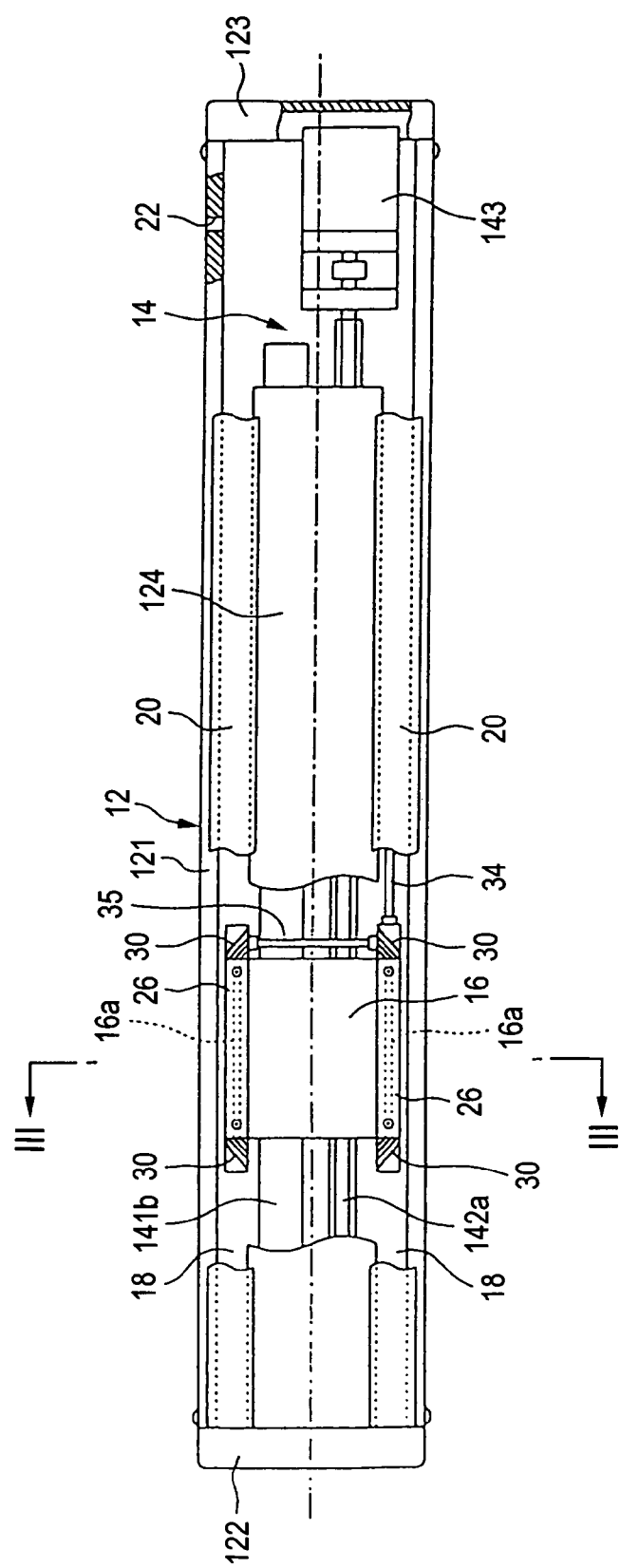
FIG. 1 is a plan view illustrating a workpiece carrier according to a first embodiment of the invention.
Figure 2:
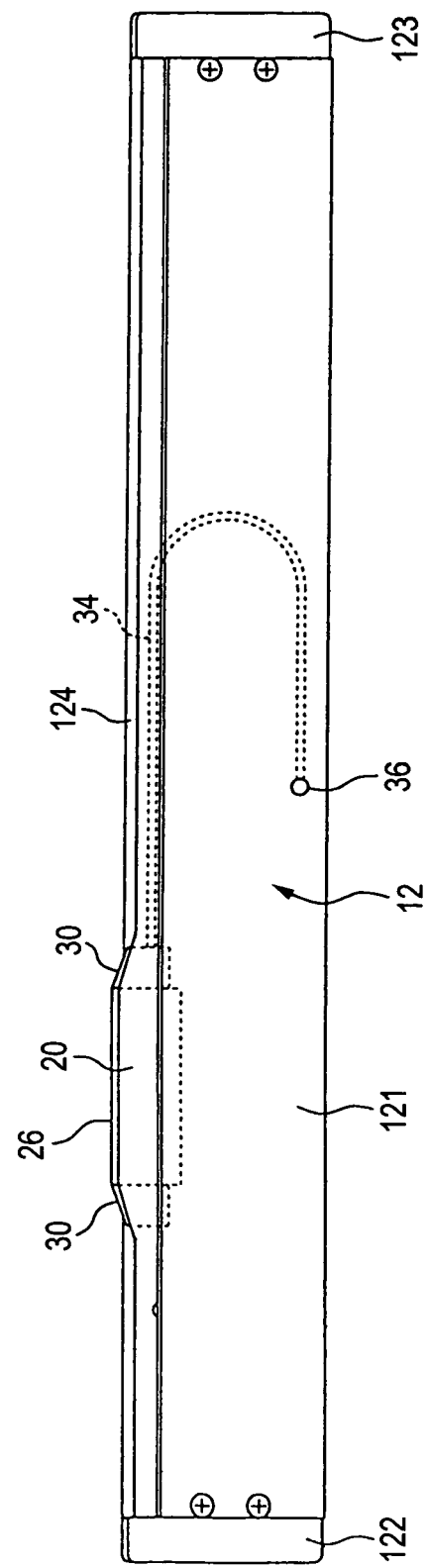
FIG. 2 is a side view illustrating the workpiece carrier shown in FIG. 1.

FIGS. 1 to 7 are views illustrating a first embodiment of the invention. As shown in FIG. 1, a workpiece carrier according to the first embodiment comprises a box-like casing 12, a feed mechanism 14 provided in this casing 12, and a carriage 16 to be fed and driven by this feed mechanism 14 in the longitudinal direction of the casing 12.

The casing 12 comprises a casing body 121, end covers 122 and 123 (see FIG. 2), and a rectangular top plate 124. The casing body 121 has a U-shaped section and also has side wall portions 121b, 121b on both sides of a bottom plate portion 121a (see FIG. 3). The end covers 122 and 123 (see FIG. 2) mounted at both longitudinal ends of this casing body 121 in such a manner that they are opposed. The rectangular top plate 124 has both ends, which are respectively supported by these end covers 122 and 123. The casing body 121 is provided with two elastic seal blades 20, 20 for sealing rectangular openings 18, 18 (see FIG. 1) each formed between the top plate 124 and a corresponding one of the side wall portions 121b, 121b. Moreover, a suction hole 22 (see FIG. 1) for setting the inside of the casing 12 under a negative pressure.

The elastic seal blade 20 is formed from an elastic material, such as rubber or resin. Further, the elastic seal blade 20 is formed like an elongated rectangle. This elastic seal blade 20 has a plurality of incision grooves 24 (see FIG. 4) provided alternately in front and rear surface portions in such a manner as to extend in a direction perpendicular to the longitudinal direction of the elastic seal blade 20 and as to be parallel to one another.

The feed mechanism 14 comprises a linear guide 141 (see FIG. 3), a ball screw 142, and a drive motor 143 (see FIG. 1). The linear guide 141 guides the carriage 16 in the longitudinal direction of the casing 12. The ball screw 142 slide-drives a slider 141a of this linear guide 141 in the longitudinal direction of a guide rail 141b. The drive motor 143 (see FIG. 1) rotation-drives a screw shaft 142a of this ball screw 142. When the screw shaft 142a is rotated by the drive motor 143, a nut 142b fixed to a bracket 15, which is provided on th bottom portion of the carriage 16, performs reciprocating motions in an axial direction of the screw shaft 142a.

Figure 3:
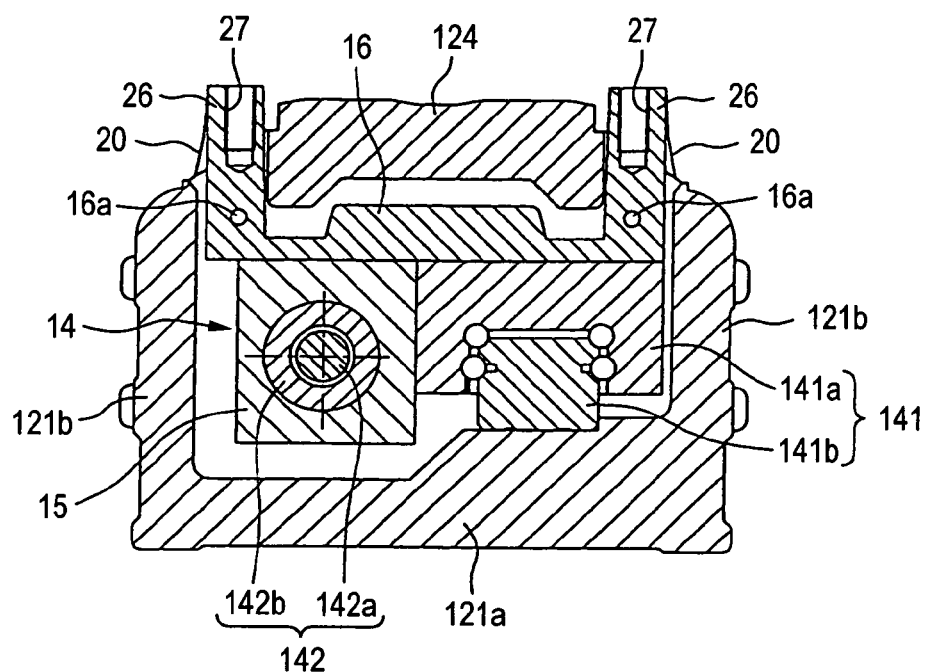
FIG. 3 is a sectional view taken along line III—III of FIG. 1, as viewed in the direction of arrows.
Figure 4:
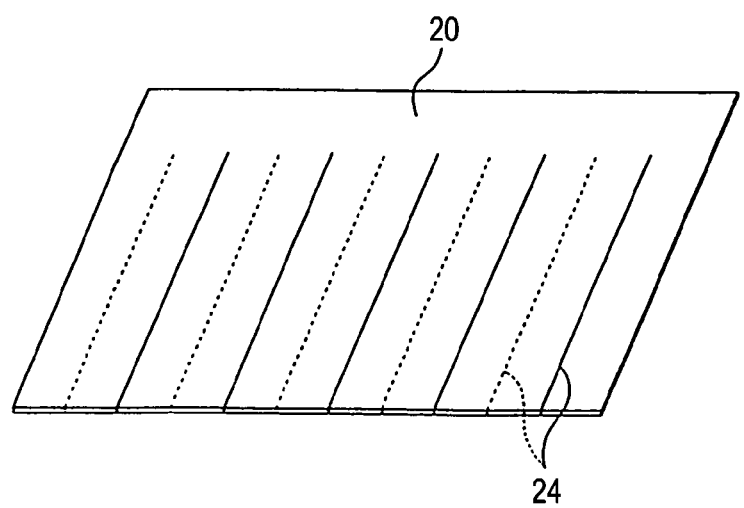
FIG. 4 is a perspective view illustrating an elastic seal blade shown in FIGS. 1 to 3.
Figure 5:
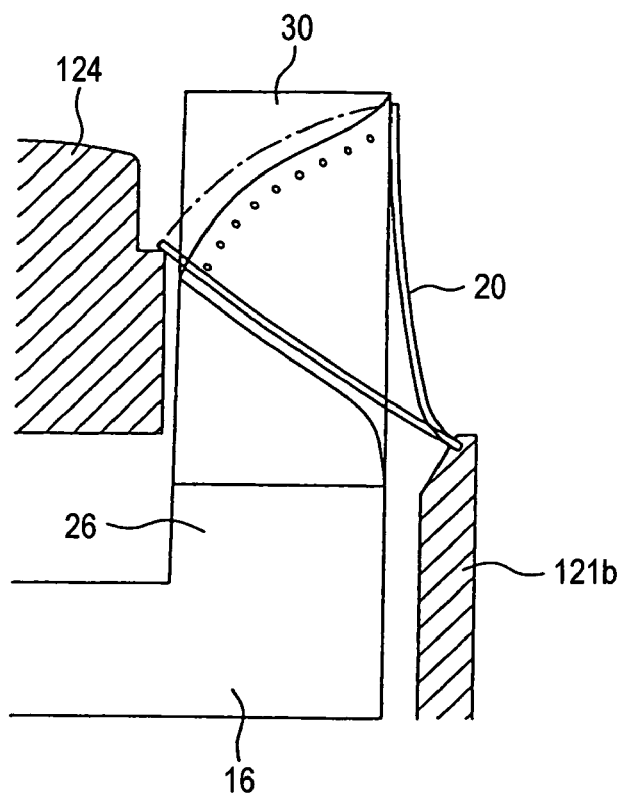
FIG. 5 is a view illustrating a primary part of a workpiece carrier according to the first embodiment of the invention.
Figure 6:
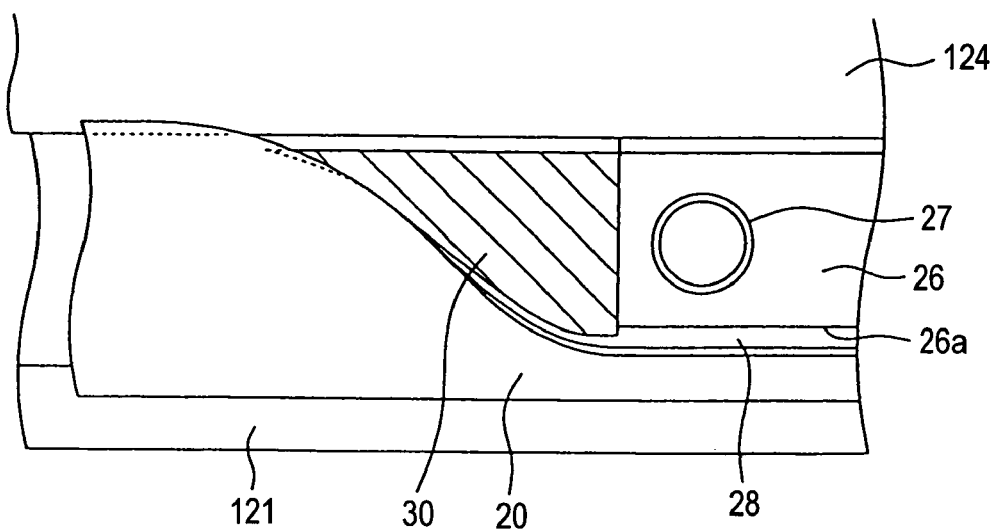
FIG. 6 is a plan view of FIG. 5.

The carriage 16 is fixed to the top surface of the slider 141a. As shown in FIG. 3, two workpiece mounting seats 26, 26 are respectively provided on both side portions of this carriage 16 in such a way as to be integral with the carriage 16. These workpiece mounting seats 26 are each formed like a block. In the top surface portion of each of the workpiece mounting seats 26, screw holes 27, 27 for bolt-fixing a workpiece (not shown) to the workpiece mounting seat 26 are provided. Further, the top portion of each of the workpiece mounting seats 26 upwardly projects from the casing 12 through the aforementioned opening portion 18. As shown in FIGS. 5 and 6, at both ends in the moving direction of each of the workpiece mounting seats 26, paired separating members 30 for separating the elastic seal blade 20 from an outer surface 26a of the workpiece mounting seat 26 are provided.

Figure 7:
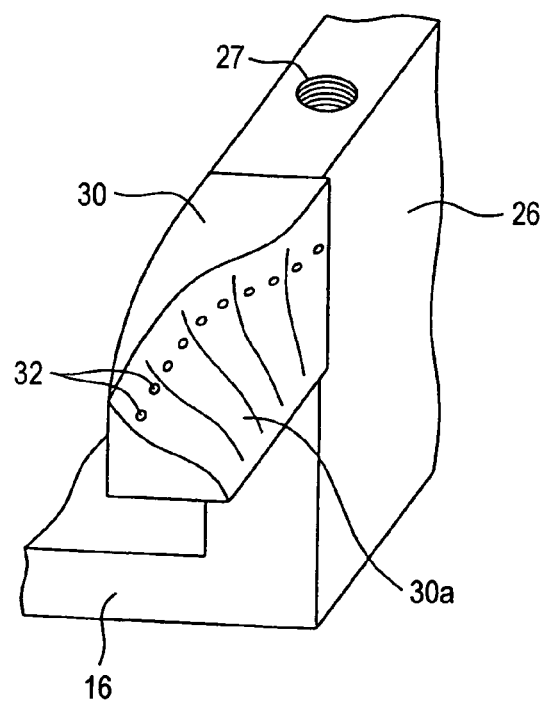
FIG. 7 is a perspective view illustrating a part of a carriage shown in FIG. 5.

Each of the separating members 30 is formed in such a way as to be hollow. Further, as shown in FIG. 7, each of the separating members 30 has a plurality of gas blowoff holes 32 at a part thereof facing the elastic seal blade 20. These gas blowoff holes 32 are arranged side by side on a curved line in such a manner as to be placed on the somewhat lower side of a ridgeline of the seal blade 20 deformed according to the shape of the separating member 30. Gas is supplied from an external gas supply source (not shown) to the inside of each of the separating members 30 through a compressed-gas supply hole 36 (see FIG. 2) provided in the casing body 121 and a flexible gas supply tube 34 (see FIGS. 1 and 2). That is, among four separating members 30, the right lower one as viewed in the figure is directly supplied with gas from the gas supply tube 34. The right upper one is supplied with gas through a connecting tube 35. The left lower one and the left upper one are respectively supplied with gas from the right lower one and the right upper one through a through hole 16a (see FIGS. 1 and 3) penetrating through the carriage 16. The elastic seal blade 20 is separated from the separating member 30 itself and an outer surface 26a of the workpiece mounting seat 26 by gas blown out of the gas blowoff hole 32.

On the other hand, during slightly elastically deformed, the elastic seal blade 20 is pushed against the top plate 124 by the own elasticity thereof at places other than the movable portions, such as the carriage 16. However, the elasticity is not very high. Moreover, a pushing force caused by setting the inside of the casing under a negative pressure (as will be described later) is small. Thus, the elastic seal blade 20 can easily be separated from the separating member 30.

In the workpiece carrier according to the first embodiment of the invention, the elastic seal blades 20, which seal the opening portions 18, 18 each formed between the top plate 124 and an associated on of the side wall portions 121b, 121b of the casing body 121, are separated from the outer surfaces 26a of the workpiece mounting seat 26 by the separating members 30 provided at both ends in the moving direction of each of workpiece mounting seats 26. Therefore, the elastic seal blades 20 are not worn by the workpiece mounting seats 26. Consequently, abrasive powder can be prevented from being discharged. Moreover, the feed accuracy of the feed mechanism 14 can be prevented from being degraded owing to the abrasive powder of the elastic seal blades 20. Thus, the workpiece can be conveyed with high accuracy.

Furthermore, in the aforementioned first embodiment, the elastic seal blades 20 are separated from the separating members 30 by the gas blown out of the gas blowoff holes 32. Thus, the elastic seal blades 20 do not slide-contact the separating members 30. Even when the elastic seal blades 20 slide-contact the separating members 30, a slide-contacting frictional force is extremely small owing to the intervention of the gas therebetween. Hence, abrasive powder is not produced by wearing the elastic seal blades 20 owing to the slide-contact between the separating member 30 and each of the elastic seal blades 20. Consequently, the abrasive powder can be prevented from being discharged to the outside. Moreover, the workpiece can be conveyed with higher accuracy.

Further, the aforementioned first embodiment can set the inside of the casing 11 under a negative pressure by providing the suction hole 22 in the casing body 121. Thus, abrasive powder, which is produced from the feed mechanism 14 provided in the casing, and lubricant can be prevented from being discharged to the outside.

Furthermore, gas blown out of the gas blowoff hole 32 of the separating member 30 contributes to suppressed discharge of abrasive powder from the inside of the casing to the outside thereof. As described above, the setting of the inside of the casing 12 under a negative pressure prevents discharge of dust from the inside of the casing to the outside thereof to some extent. However, especially, when the carriage 16 moves at a high speed, a positive pressure may locally be caused owing to rapid compression of space in front of the moving carriage. In such a case, it is hard to say that dust can completely be prevented from being discharged from the inside of the casing through the gap between the elastic seal blade 20 and the carriage 16. At that time, the gas blown out of the gas blowoff hole 32 locally causes a positive high pressure in the gap between the elastic seal blade 20 and the separating member 30. Consequently, an airflow generated from the inside of the casing by the positive pressure of the space in front of the carriage 16 is blown back to the inside thereof by the gas blown out of the gas blowoff hole 32, because the pressure of the airflow is not very high. Thus, the gas blown out of the gas blowoff hole 32 functions as an aircurtain to thereby obtain high sealability.

Incidentally, because of the aforementioned function of the gas blowoff hole 32, the invention can be applied not only to the case that the workpiece carrier requires a high degree of cleanness of the outside thereof, similarly as this embodiment, but to the case that dust should be prevented from entering the inside thereof from the outside thereof. Additionally, in such a case, the setting of the inside of the casing under a negative pressure is not performed.

Further, in the aforementioned first embodiment, a large number of incision grooves 24 are provided alternately in the front surface portion and the rear surface portion of each of the elastic seal blades 20 in such a way as to extend in a direction perpendicular to the longitudinal direction of the elastic seal blade 20 and as to be parallel to one another. Consequently, the elastic seal blades 20 are easy to expand in the longitudinal direction, thus, easy to bend. Therefore, each of the elastic seal blades 20 is easily and elastically deformed along the shape of an associated one of the separating members 30. Thus, each of the elastic seal blades 20 is easily deformed according to the shape of an associated one of the separating members 30. Consequently, this embodiment can effectively restrain the gap between the elastic seal blade 20 and the separating member 30 from locally increasing, and conversely, can restrain the elastic seal blade 20 and the separating member 30 from being in contact with each other. Further, the property of easily expanding in the longitudinal direction of the elastic seal blade means that a relatively large amount of longitudinal deformation per unit length of the elastic seal blade is tolerable. Thus, the length of a portion thereof, which extends along the separating member 30 and involves a deformed part, can be reduced. That is, the length of the separating member 30 can-be decreased. Reduction in total length of an actuator is enabled. On the other hand, each of the elastic seal blades 30 has sufficient stiffness in a direction perpendicular to the longitudinal direction. Thus, the elastic seal blades can obtain a state in which these blades are in contact with the top plate 24 at places other than the movable portions, such as the carriage 16.

Next, a second embodiment of the invention is described hereinbelow by referring to FIGS. 8 and 9. Incidentally, the same portions as those shown in FIGS. 1 to 7 are designated by the same reference characters. Further, the detailed description of such portions is omitted herein.

Figure 8:
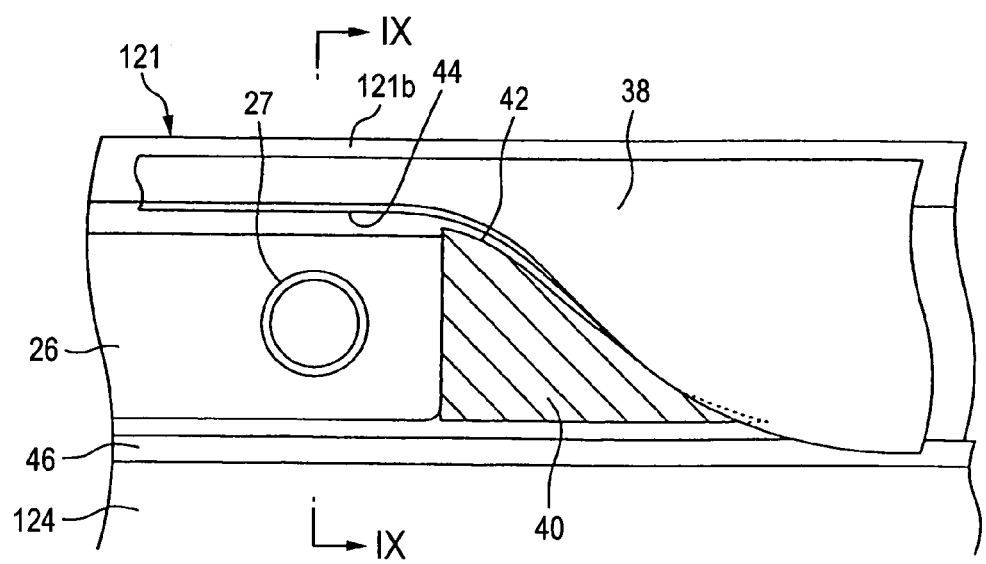
FIG. 8 is a view illustrating a primary part of a workpiece carrier according to a second embodiment of the invention.
Figure 9:
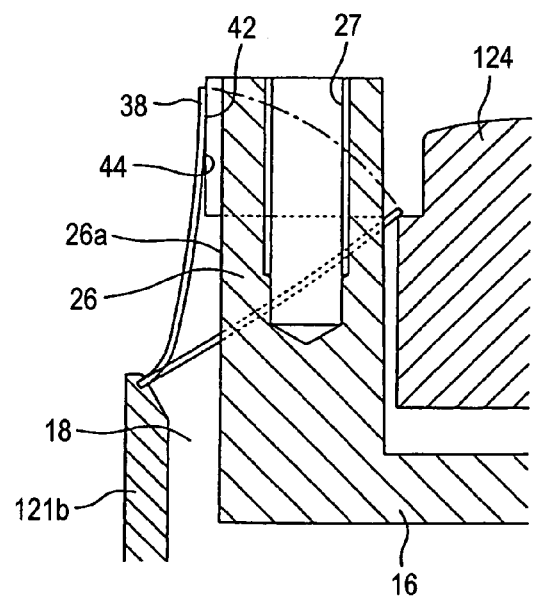
FIG. 9 is a sectional view taken along line IX—IX of FIG. 8, as viewed in the direction of arrows.

As shown in FIGS. 8 and 9, the casing body 121 has two elastic seal blades 38, 38 for sealing the opening portions 18, 18 each formed between the top plate 124 and an associated one of the side wall portions 121b, 121b. These elastic seal blades 38 are each formed like an elongated rectangle. The top plate 124 is formed from aluminum that is a nonmagnetic material.

The carriage 16 has two workpiece mounting seats 26 provided on both side portions thereof in such a way as to upwardly protrude from the casing 12 through the opening portions 18. Paired separating members 40 for separating the elastic seal blades 38 from the outer surfaces 26a of the workpiece mounting seats 26 are provided at both ends in the moving direction of these workpiece mounting seats 26. These separating members 40 are constituted by permanent magnets. On a portion thereof facing the elastic seal blade 38, a first magnetic force generating surface 42 of, for example, S-pole is formed.

On the other hand, the elastic seal blade 38 is formed from an elastic material, such as a resin including magnetic powder, such as ferrite powder. On apart of each of the elastic seal blades 38, which faces the separating member 40, a second magnetic force generating surface 44 of, for instance, S-pole is formed. This second magnetic force generating surface 44 has the same polarity as that of the first magnetic force generating surface 42 provided on the separating member 40.

In the second embodiment of the invention configured in this way, the elastic seal blade 38 is separated from the outer surface 26a of the workpiece mounting seat 26, so that the elastic seal blade 38 is not worn by the workpiece mounting seat 26. Thus, similarly as the first embodiment, abrasive powder can be prevented from being discharged to the outside. Moreover, the feed accuracy of the feed mechanism can be prevented from being degraded owing to abrasive powder of the elastic seal blade 38. Consequently, the workpiece can be conveyed with high accuracy.

Further, magnetic forces repelling each other are generated between the first magnetic force generating surface 42, which is provided on the separating member 40, and the second magnetic force generating surface 44 provided on the elastic seal blade 38. Consequently, the elastic seal blades 38 do not slide-contact the separating member 40. Even when slide-contacting the separating member 40, a frictional force is extremely small owing to a repulsion force between both the surfaces. Therefore, the elastic seal blades 38 are worn by the separating members 40, so that abrasive powder does not occur. Thus, workpieces can be conveyed with higher accuracy.

Figure 10:
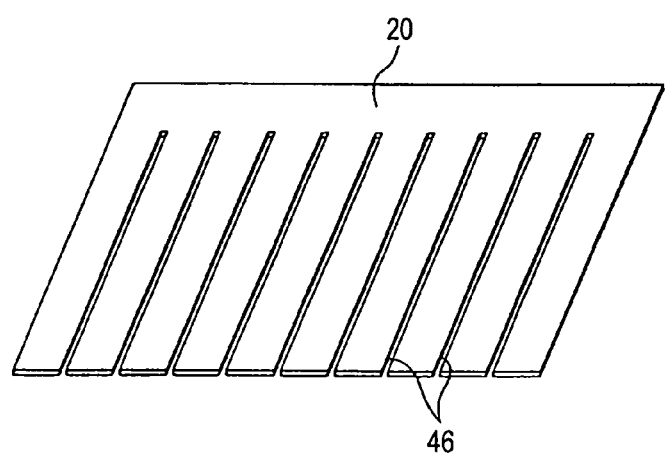
FIG. 10 is a view illustrating an elastic seal blade of a workpiece carrier according to a third embodiment of the invention.
Figure 11:
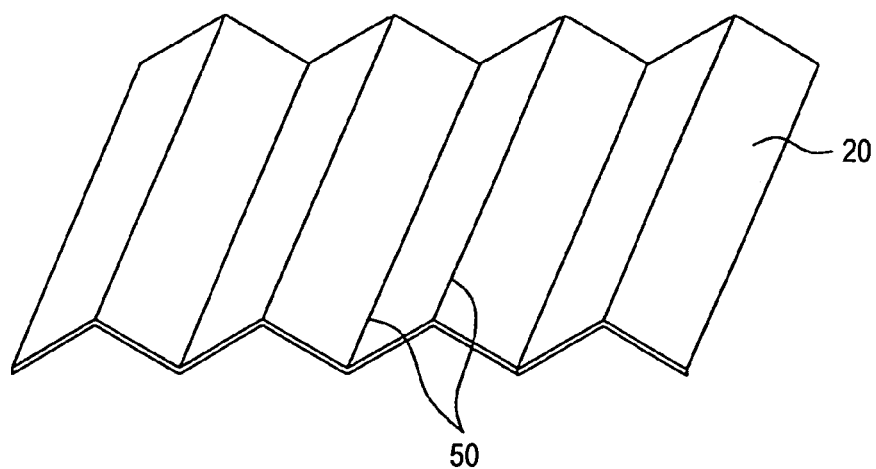
FIG. 11 is a view illustrating an elastic seal blade of a workpiece carrier according to a fourth embodiment of the invention.
Figure 12:
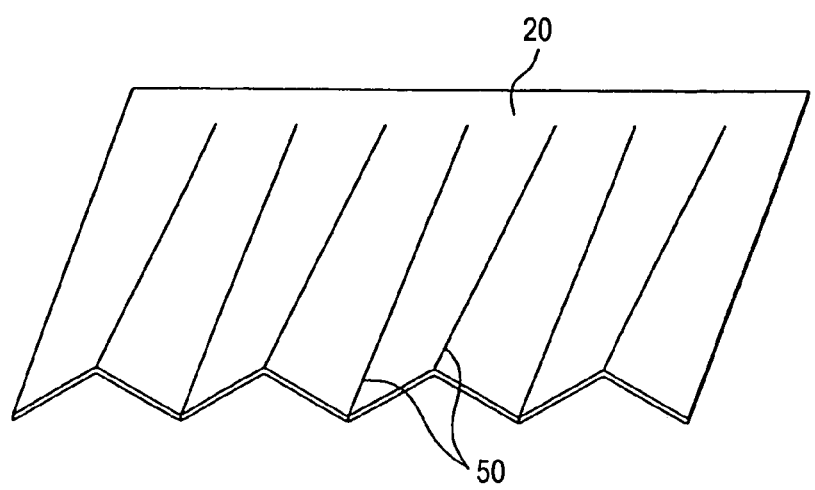
FIG. 12 is a view illustrating an elastic seal blade of a workpiece carrier according to a fifth embodiment of the invention.

Incidentally, the invention is not limited to the aforementioned embodiments. For example, in the first embodiment of the invention, a plurality of incision grooves 24 are provided in each of the elastic seal blades 20 so as to easily deform each of the elastic seal blades 20 along the shape of the separating member 30. However, similar advantages can be obtained by providing a plurality of slits 46 in each of the elastic seal blades 20 in such a way as to extend in a direction perpendicular to the longitudinal direction of the elastic seal blades 20, like a third embodiment of the invention illustrated in FIG. 10. Furthermore, like the fourth embodiment illustrated in FIG. 11 and the fifth embodiment illustrated in FIG. 12, similar advantages can be obtained by providing a plurality of folding lines 50 in each of the elastic seal blades 20 in such a way as to extend in a direction perpendicular to the longitudinal direction of the elastic seal blade 20.

In any case, the elastic seal blades are easy to expand or bend in the longitudinal direction, and enabled to have stiffness to a necessary extent in the direction perpendicular to the longitudinal direction. Additionally, similar advantages can be obtained by forming the seal blades, for example, from an anisotropic material whose modulus of longitudinal elasticity in a direction perpendicular to the longitudinal direction is higher than that in the longitudinal direction. Needless to say, employment of such elastic seal blades can be applied to the second embodiment.

Further, although the separating members are mounted on to the end portions of the carriage in each of the embodiments, for instance, the workpiece carrier may be configured so that cutout portions are provided on four corners of the carriage and the separating members are mounted in these cutout portions.

Furthermore, although the gas blowoff holes 32 are provided only in both end portions, at which reaction forces from the seal blades 20 are large, of each of the workpiece mounting seats 26 in the aforementioned first embodiment, the gas blowoff holes 32 may be provided over the entire length of the outer surface of each of the workpiece mounting seats 26. Similarly, in the second embodiment, the separating members 40 may be provided over the entire length of the outer surface of the work mounting seats 26.

Further, although the combination of the ball screw and the linear guide is used as the feed mechanism and driven by a motor, various kinds of other combinations, such as the combination of a linear motor and a linear guide, and the combination of a motor, a pulley, and a belt, may be used. The guide device is not limited to the linear guide. Sliding guide or a hydrostatic guide may be used. Furthermore, although the motor is provided in the casing, a motor may be exposed to the outside of the casing in the case of no raising dust from the motor. Additionally, the casing is not limited to those of the aforementioned embodiments.

As described above, according to the first workpiece carrier of the invention, the workpiece mounting seats of the carriage do not move in the longitudinal direction by simultaneously slide-contacting the elastic seal blades. Thus, the feed accuracy of the feed mechanism is prevented from being degraded owing to abrasive powder of the elastic seal blade. Consequently, workpieces can be conveyed with high accuracy.

According to the second and third workpiece carriers of the invention, similarly, the elastic seal blades do not slide-contact the separating members. Thus, the workpieces can be conveyed with higher accuracy.

Especially, according to the second workpiece carrier of the invention, the gap between the seal blade and the separating ember locally has a positive pressure. Thus, dust and lubricant can be restrained from moving from the inside of a casing to the outside of the casing or from the outside of the casing to the inside of the casing.

According to the fourth workpiece carrier of the invention, dust and lubricant can effectively be restrained from being discharged from the inside of the casing. Moreover, the opening portion formed between the side wall portion of the casing body and the top plate can be further airtightly sealed by the elastic seal blades. Consequently, in addition to the aforementioned advantages, the workpiece carrier of the invention have another advantage in that abrasive powder can be prevented from being discharged to the outside of the casing.

According to the fifth to eighth workpiece carriers of the invention, the elastic seal blade can easily be deformed along the separating member. Thus, in addition to the aforementioned advantages, the workpiece carrier of the invention has another advantage in that sealing performance is enhanced and the length of the separating member is reduced by minimizing the gap between the elastic seal blade and the separating member.

What is claimed is:

1. A workpiece carrier comprising:
    a feed mechanism;
    a carriage driven by said feed mechanism; and
    a casing accommodating at least a part of said feed mechanism and said carriage, said casing having at least one opening portion which is provided along a direction of feeding performed by said feed mechanism; and
    an elastic seal blade for sealing said opening portion,
    wherein said carriage has a workpiece mounting seat which passes through said opening portion and projects upwardly from said casing, and also has a separating member connected to each end of said workpiece mounting seat in a moving direction of said workpiece mounting seat, for separating said elastic seal blade from an outer surface of said workpiece mounting seat.

2. The workpiece carrier according to claim 1, wherein said separating member has a plurality of gas blowoff holes facing said elastic seal blade.

3. The workpiece carrier according to claim 1, wherein said separating member has a first magnetic force generating surface on a part thereof facing said elastic seal blade, and wherein said elastic seal blade has a second magnetic force generating surface, which is provided on a part thereof facing said separating member and has a same polarity as that of said first magnetic force generating surface.

4. The workpiece carrier according to claim 1, wherein said casing has a suction hole for setting an interior portion of said casing under a negative pressure.

5. The workpiece carrier according to claim 1, wherein said elastic seal blade is constructed in such a way as to be easy to expand in a feed direction of said feed mechanism and as to be less easy to expand in a direction perpendicular to the feed direction.

6. The workpiece carrier according to claim 5, wherein said elastic seal blade is formed substantially as an elongated rectangle and has a plurality of incision grooves, and wherein said incision grooves are provided alternately in front and rear surface portions in such a way as to be parallel to one another in a direction perpendicular to a longitudinal direction of said elastic seal blade.

7. The workpiece carrier according to claim 5, wherein said elastic seal blade is formed substantially as an elongated rectangle and has a plurality of slits, and wherein said slits are provided in such a way as to extend in a direction perpendicular to a longitudinal direction of said elastic seal blade and as be parallel to one another.

8. The workpiece carrier according to claim 5, wherein said elastic seal blade is formed substantially as an elongated rectangle and has a plurality of folding lines, and wherein said folding lines are provided in such a way as to extend in a direction perpendicular to a longitudinal direction of said elastic seal blade and as be parallel to one another.

9. A workpiece carrier comprising:
a carriage;
a casing accommodating at least a part of said carriage and having at least one opening portion which is provided along a feed direction in which the carriage moves; and
a seal blade for sealing each opening portion,
wherein said carriage has at least one workpiece mounting seat corresponding to each opening portion and passing through said opening portion, said at least one workpiece mounting seat also having at least one separating member for separating said seal blade,
wherein said at least one separating member has a plurality of gas blowoff holes facing said seal blade for providing a gas having a pressure greater than that outside of said casing.

10. The workpiece carrier according to claim 9, wherein said casing has at least one suction hole for setting an interior portion of said casing under a negative pressure.

11. The workpiece carrier according to claim 9, wherein said at least one separating member has a plurality of gas blowoff holes facing said seal blade for providing a gas having a pressure greater than that outside of said casing such that the gas flow induced by the total number of suction holes exceeds the gas flowing through the total number of gas blowoff holes.

12. The workpiece carrier according to claim 9, wherein said at least one workpiece mounting seat has gas blowoff holes along an entire length facing said seal blade.

13. A workpiece carrier comprising:
a carriage;
a casing accommodating at least a part of said carriage and having at least one opening portion which is provided along a feed direction in which the carriage moves; and
a seal blade for sealing each opening portion,
wherein said carriage has at least one workpiece mounting seat corresponding to each opening portion and passing through said opening portion, said at least one workpiece mounting seat also having at least one separating member for separating said seal blade,
wherein said seal blade includes flex channels disposed along the feed direction of said seal blade oriented substantially perpendicular to said feed direction, wherein each flex channel is a folding line, an incision groove or a slit.

14. The workpiece carrier of claim 13, wherein said flex channels are disposed alternatively on the front and rear surface of said seal blade.

* * * * *